United States Patent Office 3,128,673
Patented Apr. 14, 1964

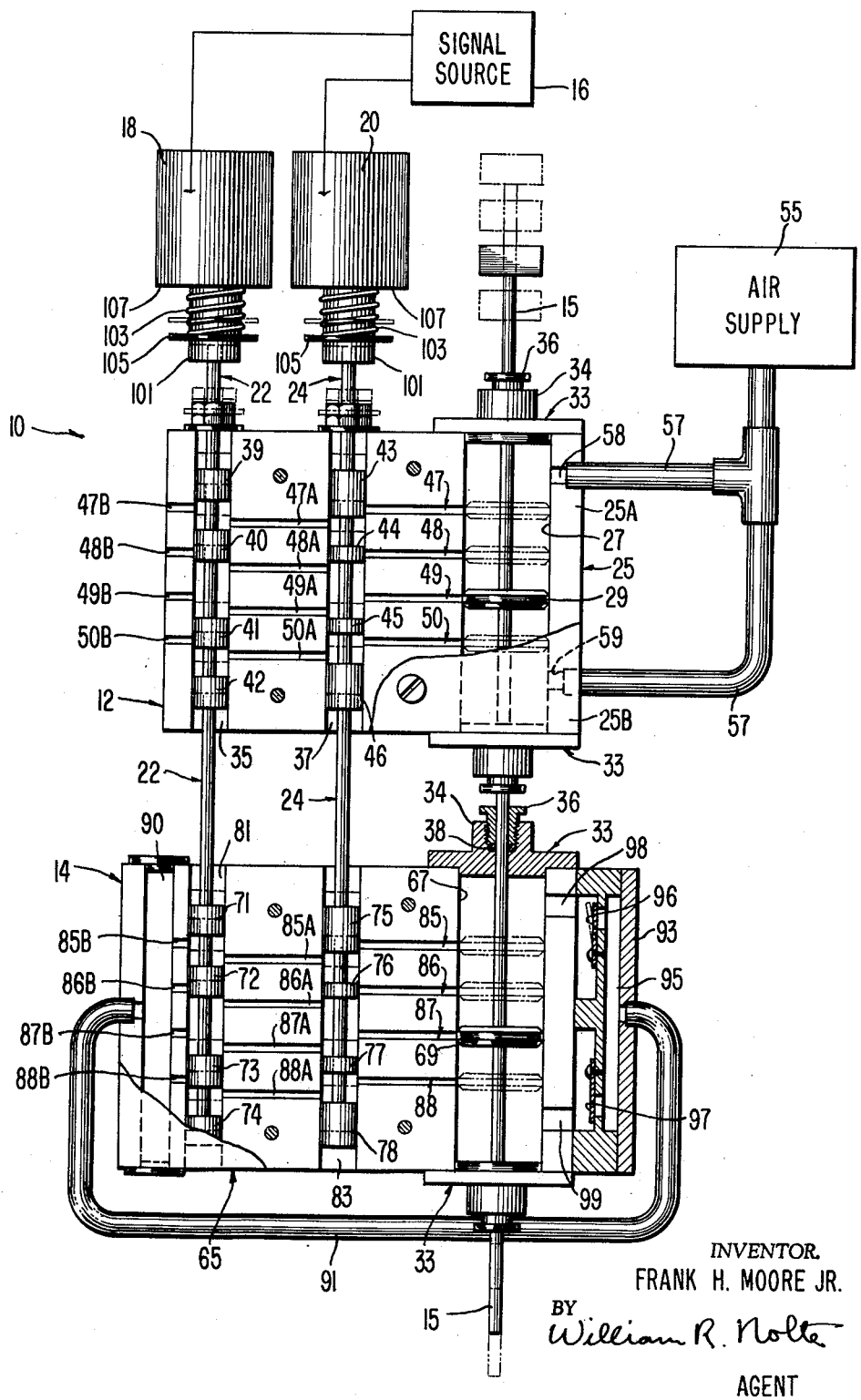

3,128,673
POSITIONING APPARATUS
Frank H. Moore, Jr., Wayne, Pa., assignor to Burroughs Corporation, Detroit, Mich., a corporation of Michigan
Filed Jan. 30, 1962, Ser. No. 169,887
7 Claims. (Cl. 91—43)

This invention relates to positioning devices and more particularly to pneumatic positioning devices employing fluid damping apparatus therefor.

Prior art pneumatic positioning devices have in general consisted of piston cylinder arrangement having an inlet at each end thereof connected to a source of compressed air. A pair of outlet openings with valves are also provided in the cylinder such that when it is desired that the piston move, the output where it is desired that the piston stop is opened, thus permitting air to be exhausted from one end of the cylinder. This reduces the pressure on that side of the piston, which is pushed toward the open outlet by the full pressure on the opposite side of the piston. In practice the piston does not stop and remain at rest but "over shoots" the open outlet or port and continues to oscillate indefinitely. This oscillation in prior art devices has been stopped by friction and by hydraulic dash pot devices which do not eliminate entirely but permit a few oscillations. Moreover, the friction devices have an additional disadvantage in that the same slow the movement of the piston by the drag which is present during the entire range of movement of the air piston.

It is therefore the principal object of this invention to provide improved positioning apparatus which avoids one or more of the disadvantages of the prior art arrangements and which has improved and precise stopping capabilities.

It is a further object of this invention to provide improved positioning apparatus having means movable to one of a plurality of positions without oscillation.

In accordance with the invention, the positioning apparatus operable over a range of locations or stops comprises an air positioning cylinder and a fluid damping cylinder, each having a piston mounted on the same rod to operate in tandem. Inlet openings in opposite ends of the positioner cylinder connected to a medium under pressure admit pressure on both sides of the piston. The positioning and damping cylinders each include a number of like located exhaust ports such that when the positioner piston closes one of the exit ports of its cylinder, the damping piston closes a corresponding port in its cylinder. Valves are provided for the exhaust ports of both the positioner and damping cylinder which likewise operate in tandem so that when a given valve is opened in the positioner cylinder the corresponding valve in the damping cylinder is also opened. All of the ports in the damper cylinder exhaust into a common pipe which communicates with each end of the damping cylinder through a check valve at each end. When an exhaust port in the positioner cylinder is opened its piston travels toward it. Simultaneously, the corresponding exhaust port in the damping cylinder is opened and its piston is moved by the common rod, pushing the fluid out the open valve, through the pipe, through a check valve and into the cylinder on the trailing side of the piston. Movement continues until the piston closes the open port, and at the instant that its port is closed, further movement of the piston is arrested by fluid trapped on both sides of the piston. The fluid being inelastic, thus precludes bounce or oscillation.

For a better understanding of the present invention, together with other and further objects thereof, reference is had to the following description taken in connection with the accompanying drawing and its scope will be pointed out in the appended claims.

In the drawing, the single figure is a front elevational view, partially in section, showing a multiple positioning apparatus embodying the present invention.

Referring to the figure of the drawing there is shown a multiple positioning apparatus 10 which includes a positioner 12 in combination with a fluid damping unit 14 which is capable of establishing actuator rod 15 in one of a plurality of positions. Included in the apparatus are a pair of control devices which are electrically operated and controlled from a signal source as at 16. In general the control devices are in the form of solenoids 18 and 20 which operate valve members 22 and 24 respectively. The positioner 12 including a casing 25 of two-part construction consisting of half-sections 25A and 25B, which when joined together define a power cylinder 27 within which is co-axially arranged a piston 29 mounted upon actuator rod 15. Each end of the cylinder is closed by means of an end plate 33, to be described in detail hereinafter. The casing half-sections when joined together also define two secondary cylinder bores 35 and 37 to receive the aforementioned valve spool members 22, 24 respectively. Spool valve member 22 includes a plurality of axially spaced piston elements or spools 39, 40, 41 and 42, while spool valve 24 includes axially spaced spools 43, 44, 45 and 46. The casing sections 25A and 25B also define a plurality of passageways 47, 48, 49 and 50 which interconnect the cylinder bore 27 with the spool bores 37 and 35 respectively. Passages 47 to 50 inclusive, include offset portions 47A to 50A inclusive which extend between bores 37 and 35, and terminal portions 47B to 50B respectively which lead from bore 35 to the atmosphere. A medium under pressure designed to reference character 55, is supplied to both ends of the power cylinder 27 by means of piping 57 through inlets 58 and 59. While the medium 55 may include a suitable air supply under pressure as indicated, the medium may also constitute a suitable fluid in which case the exhaust ports 47b to 50b inclusive would empty into a suitable reservoir not shown.

The fluid damping unit 14 associated with positioner unit 12 is similar in construction to the latter unit and includes a two-part casing 65 which when assembled defines damping cylinder 67. The ends of the cylinder are also fitted with the aforementioned end plates 33, each of which includes an integral cupped boss 34, which is internally threaded, to engage with external screw threads formed on nut 36. Packing material 38 fitted within the upper portion of boss 34 is provided to prevent leakage of the fluid under pressure from cylinder 67. Piston 69, fitted upon the lower end of piston actuator rod 15 travels within the cylinder 67 and operates in tandem with piston 29. In a similar manner valves 22 and 24 each include along their lower portions a plurality of axially spaced spools 71, 72, 73, 74 and 75, 76, 77 and 78 respectively, which are received in bores 81 and 83 of the casing. Similarly passages 85, 86, 87 and 88 are provided which are like spaced as 47 to 50 inclusive above and include offset portions 85A to 88A inclusive extending between bores 83 and 81, and terminal portions 85B to 88B inclusive. The latter terminal portions connect bore 81 with enlarged passage 90 which is integral with casing 65. Suitable piping 91 connects the passage 90 to the opposite side casing portion 93 which likewise includes an elongated chamber 95 extending parallel to the fluid cylinder 67. Check valves 96 and 97 located in line with inlet openings 98 and 99 at opposite ends of cylinder 67 admit fluid under pressure due to motion of piston 69 to both ends of the cylinder. The construction of the check valves however, is such as to preclude escape of fluid from the cylinder 67 in a reverse direction into the pipe 91. It is apparent that a suitable medium such as an inelastic fluid may be supplied to manifold chamber 90 in a manner to preclude trapping air or other compressible media which would tend to render the medium compressible.

The solenoid units 18 and 20 are identical one to another and each is shown as including a plunger 101 which is axially aligned with and connected to its associated spool valves 22 and 24 respectively. A spring 103 encircles the plunger 101 to engage a shoulder portion 105 at one end thereof, and at its other end abuts a face portion 107 of its respective solenoid housing. When for example solenoid 18 is energized, plunger 101 is actuated so as to compress spring 103 to thereby move spool valve 22 to its phantom line position as shown. When the solenoid is de-energized, valve 22 under the action of spring 103 is restored to its full line position as shown. Solenoids 18 and 20 may be permutably operated by receipt of electrical signals from the signal source as at 16. With any combination of electrical signals so received one and only one of the passages 47 to 50 inclusive will be opened. Spool valves 22 and 24 will be so positioned as to permit air to be exhausted from the pneumatic cylinder 27 through a selected one of the passages.

When for example piston 29 is in its topmost phantom line position opposite port 47 and it is desired to move the same to its full line position as shown, the control solenoids are both de-energized and springs 103 move valves 22 and 24 to their full line positions as shown. Spool 45 of spool valve 24 and spool 41 of spool valve 22, it is noted do not block the passage 49, which includes portions 49A, 49B leading to the atmosphere. Since port 49 is thus opened, piston 29 will move downwardly because of the reduced pressure in the lower portion of cylinder 27 which has been opened to the atmosphere. Piston 29 continues to move downwardly until the open port 49 is blocked by the piston.

In order to eliminate over-shoot and oscillation of the piston 29, the fluid damping unit 14 is provided which operates in tandem with the positioner unit 12. It is observed that when the bore 49 is opened in the pneumatic drive unit 12, the like located port 87 is also opened in fluid damping unit 14 below. Spool 77 affixed to the lower portion of spool valve 24, and spool 73 affixed to the lower portion of spool valve 22, it is seen are positioned, upon movement of valves 24, 22 so as not to obstruct passage 87. As the piston 69 affixed to rod 15 moves downwardly in unison with piston 29 it exhausts fluid into passage 87, including portions 87A, 87B and into chamber 90. The fluid is then exhausted through pipe 91, through the upper check valve 96, and into the top inlet 98 on the top side of piston 69. When the piston reaches the open port passage 87, the piston itself will close the passage 87. The fluid which is ahead of the piston 69, that is on the lower side, is trapped in the lower portion of cylinder 67. That fluid cannot be exhausted through the inlet portion 99 and out of the check valve 97, and no further fluid may flow through passage 87 because of the blockage by piston 69. Since all of the passages are closed and the upper end of cylinder 67 is closed by its check valve 96 the fluid is thus trapped on both sides of piston 69. In this manner the piston is brought to a complete and sudden stop without flutter or oscillation.

From the above description it has been observed that the control units 18 and 20 may be permutably energized to simultaneously open one and only one of the exhaust ports in the air cylinder 27 and in the fluid cylinder 67. Each combination of movement imparted to the spool valves 22 and 24, thus positions the actuator piston rod 15 to a selected location. While two control units are employed in the illustrated embodiment of the invention it is apparent that the number of such control units may be expanded or diminished as well as the number of exhaust ports disposed along the pneumatic and fluid cylinder walls to achieve the desired number of stopping positions of the actuator rod. It is further seen that the mechanism presents a simplified arrangement of apparatus to eliminate oscillation in air system devices. The mechanism moreover utilizes fewer moving parts, is more reliable than those previously for this purpose, has greater capabilities, and is adaptable for general and widely varying purposes.

While there have been shown there described and pointed out the fundamental features as applied to the previous embodiment, it will be understood that various omissions and substitutions and changes in forms and details in the device illustrated, and its operation may be made by those skilled in the art without departing from the spirit of the invention. It is the intention therefore to be limited only as indicated by the source of the following claims.

What is claimed is:

1. A positioning device including an elongated member, a cylinder extending therein, a piston within said cylinder and movable with respect thereto, a port at each end of said cylinder for admitting a medium under pressure, means associated with each port for preventing backflow of said medium therethrough, a plurality of passages opening into and axially spaced along the length of said cylinder, valve means associated with said passages to control the flow of medium therethrough, means for selectively opening a given valve of a passage along said cylinder, means for moving said piston toward said opened passage and means for conveying said medium flowing through the opened passage to each port at each end of said cylinder for entry into the latter.

2. A positioning device comprising a pair of pistons mounted upon a common rod, means defining first and second cylinders for said pair of pistons, an inlet port at each end of said first and second cylinders, a plurality of passages opening into and axially spaced along each cylinder, the spacing of the passages along one cylinder corresponding to the spacing of the passages along the other cylinder, the inlet ports of said first cylinder being connected to a medium under pressure, the inlet ports of said second cylinder each being provided with a check valve operable to admit a medium under pressure into the cylinder, the passages of said second cylinder being connected to the inlet ports thereof by common conduit means, valve means in each of said passages to control the flow of said medium therethrough, the valve means located in a passage associated with the first cylinder being connected in tandem to operate in unison with the valve means in the correspondingly located passage of said second cylinder, and means for selectively positioning said valve means to open a given passage in one cylinder and its correspondingly located passage in the other cylinder.

3. A positioning device including a piston mounted upon a rod, means defining a cylinder for said piston, means for actuating said rod to move said piston in said cylinder, an inlet port at each end of said cylinder, a check valve for each inlet port, a plurality of passages opening into and axially spaced along said cylinder, common conduit means connecting all of said passages to said inlet ports to thereby confine a fluid medium under pressure in a closed system, valve means in each of said passages to control the flow of said medium therethrough, and means for selectively positioning said valve means to open a given passage in said cylinder whereby fluid is exhausted through said opened passage, through said conduit means and into said cylinder on the side of the piston in which force to move the same is applied.

4. A positioning device including a piston mounted upon a rod, means defining a cylinder for said piston, an inlet port at each end of said cylinder for admitting a fluid medium under pressure, a check valve for each inlet port, a plurality of passages opening into and axially spaced along said cylinder, valve means for each of said passages, a common pipe into which each passage empties for conveying said fluid under pressure to each of said inlet ports, means for selectively actuating a given valve to open its corresponding passage, and means for moving said piston in said cylinder toward and into blocking engagement with said open passage, whereby upon such movement of said piston, fluid is pushed ahead of said cylinder under pressure through said open valve means, through said common pipe, through the check valve on the side of the piston opposite the open port, and upon said piston being moved further into blocking engagement with said port additional movement thereof is prevented by the fluid being trapped upon both sides of said piston.

5. A positioning device including a piston mounted upon a rod, means defining a cylinder for said piston, a port at each end of said cylinder and a check valve in each port for admitting fluid under pressure to said cylinder, means defining a plurality of passages opening into and axially spaced along said cylinder, a common pipe into which each passage empties for conveying fluid under pressure to each of said inlet ports, a plurality of valve members each having sets of piston elements spaced therealong movable in blocking engagement with said plurality of passages, means for permutably actuating said valve members to open one of said passages at a given time, and means for moving said piston in said cylinder toward and into blocking engagement with said open passage, whereby upon such movement of said piston, fluid is pushed ahead of said cylinder under pressure through said open valve means, through said common pipe, through the check valve on the side of the piston opposite the open port, and upon said piston being moved further into blocking engagement with said port movement thereof is prevented by virtue of fluid being trapped upon both sides of said piston.

6. In the positioning device as set forth in claim 5 wherein the number of piston elements of each said valve member corresponds in number to said plurality of passages.

7. In the positioning device as set forth in claim 5 wherein the number of said plurality of passages opening into said cylinder exceeds the number of said plurality of valve members.

References Cited in the file of this patent

UNITED STATES PATENTS

| | | |
|---|---|---|
| 528,275 | Martin | Oct. 30, 1894 |
| 1,484,030 | Kitchen | Feb. 19, 1924 |
| 2,326,498 | Rodal | Aug. 10, 1943 |
| 2,398,997 | Berry et al. | Apr. 23, 1946 |
| 2,916,205 | Litz | Dec. 8, 1959 |